United States Patent
Virčíková et al.

(10) Patent No.: US 11,783,531 B2
(45) Date of Patent: Oct. 10, 2023

(54) METHOD, SYSTEM, AND MEDIUM FOR 3D OR 2.5D ELECTRONIC COMMUNICATION

(71) Applicant: Matsuko Interactive a.s., Košice (SK)

(72) Inventors: Mária Virčíková, Košice (SK); Matúš Kirchmayer, Košice (SK); Rudolf Jakša, Košice (SK)

(73) Assignee: MATSUKO S.R.O., Košice (SK)

( * ) Notice: Subject to any disclaimer, the term of this patent is extended or adjusted under 35 U.S.C. 154(b) by 0 days.

(21) Appl. No.: 17/538,664

(22) Filed: Nov. 30, 2021

(65) Prior Publication Data
US 2022/0172424 A1 Jun. 2, 2022

Related U.S. Application Data

(60) Provisional application No. 63/120,061, filed on Dec. 1, 2020.

(51) Int. Cl.
*G06T 15/08* (2011.01)
*G06T 15/10* (2011.01)
(Continued)

(52) U.S. Cl.
CPC ............ *G06T 15/08* (2013.01); *G06N 3/045* (2023.01); *G06T 15/04* (2013.01); *G06T 15/10* (2013.01);
(Continued)

(58) Field of Classification Search
CPC . H04N 5/23229; G06T 2200/08; G06T 15/04; G06T 15/10; G06T 15/08; H04L 65/403; G06N 3/0454
See application file for complete search history.

(56) References Cited

U.S. PATENT DOCUMENTS

5,500,671 A * 3/1996 Andersson ............. H04N 7/144
348/E7.083
6,469,710 B1 10/2002 Shum et al.
(Continued)

FOREIGN PATENT DOCUMENTS

KR 10-2019-0112966 A 10/2019

OTHER PUBLICATIONS

Burgos-Artizzu, Xavier P., et al. "Real-time expression-sensitive HMD face reconstruction." SIGGRAPH Asia 2015 Technical Briefs. 2015. 1-4. (Year: 2015).*
(Continued)

*Primary Examiner* — Phi Hoang
(74) *Attorney, Agent, or Firm* — TAROLLI, SUNDHEIM, COVELL & TUMMINO L.L.P.

(57) ABSTRACT

Methods, systems, and techniques for 3D or 2.5D electronic communication, such as holographic communication. Two-dimensional image data is generated by a camera that has imaged at least part of a three-dimensional head including a face of a conference participant is obtained. A photo-realistic 2.5-dimensional or three-dimensional representation of at least part of the head is reconstructed using the two-dimensional image data. The three-dimensional representation of the at least part of the head includes a reconstruction of an area missing from the two-dimensional image data. One or more artificial neural networks, such as but not necessarily limited to a convolutional neural network and/or a multi-layer perceptron neural network, may be used for the reconstruction.

55 Claims, 8 Drawing Sheets

(51) Int. Cl.
G06T 15/04 (2011.01)
G06N 3/045 (2023.01)
H04N 23/80 (2023.01)
H04L 65/403 (2022.01)

(52) U.S. Cl.
CPC ......... *H04N 23/80* (2023.01); *G06T 2200/08* (2013.01); *H04L 65/403* (2013.01)

(56) References Cited

U.S. PATENT DOCUMENTS

| | | | | |
|---|---|---|---|---|
| 7,302,466 | B1* | 11/2007 | Satapathy | H04M 3/527 |
| | | | | 704/270.1 |
| 9,094,660 | B2 | 7/2015 | Alregib et al. | |
| 9,661,272 | B1* | 5/2017 | Daniel | G03H 1/0005 |
| 9,760,935 | B2 | 9/2017 | Aarabi et al. | |
| 10,346,893 | B1* | 7/2019 | Duan | G06F 16/9535 |
| 11,087,521 | B1 | 8/2021 | Lombardi et al. | |
| 2004/0066386 | A1* | 4/2004 | Leprevost | G06T 15/04 |
| | | | | 345/582 |
| 2017/0178306 | A1* | 6/2017 | Le Clerc | G06V 10/7715 |
| 2018/0211444 | A1* | 7/2018 | Shaviv | G06T 19/006 |
| 2018/0374242 | A1* | 12/2018 | Li | G06V 40/169 |
| 2019/0213772 | A1 | 7/2019 | Lombardi et al. | |
| 2019/0294103 | A1* | 9/2019 | Hauger | G03H 1/0443 |
| 2020/0021627 | A1 | 1/2020 | Brenes et al. | |
| 2020/0098177 | A1* | 3/2020 | Nl | G06T 7/50 |
| 2020/0133618 | A1 | 4/2020 | Kim | |
| 2020/0257891 | A1 | 8/2020 | Cole et al. | |
| 2021/0286424 | A1* | 9/2021 | Ivanovitch | G06T 19/20 |
| 2021/0342983 | A1* | 11/2021 | Lin | G06T 5/005 |

OTHER PUBLICATIONS

Pathak et al. "Context Encoders: Feature Learning by Inpainting".
Jackson et al. "Large Pose 3D Face Reconstruction from a Single Image via Direct Volumetric CNN Regression", Sep. 2017.
Isola et al. "Image-to-Image Translation with Conditional Adversarial Networks", Nov. 2018.
Wang et al. "High-Resolution Image Synthesis and Semantic Manipulation with Conditional GANs", Aug. 2018.
Krizhevsky et al. "ImageNet Classification with Deep Convolutional Neural Networks", 2012.
He et al. "Deep Residual Learning for Image Recognition", Dec. 2015.
Ronneberger et al. "U-Net: Convolutional Networks for Biomedical Image Segmentation", May 2015.
Goodfellow et al. "Generative Adversarial Nets", Jun. 2014.
Fink, Charlie. "The Trillion Dollar 3D Telepresense Gold Mine", Nov. 2017. https://www.forbes.com/sites/charliefink/2017/11/20/the-trillion-dollar-3d-telepresence-gold-mine/?sh=256ed6612a72.
BNP Paribas Real Estate. "DARE—When Science Fiction Becomes Reality", Mar. 2019. https://www.youtube.com/watch?v=13ktlkWppVs &feature=youtu.be.
https://www.doubleme.me/#holoportal.
https://spatial.io.
Dotson, Kyt. "Spatial, Nreal, Qualcomm join up to deliver 5G-enabled AR collaboration killer app", Feb. 2020. https://siliconangle.com/2020/02/20/spatial-nreal-qualcomm-join-deliver-5g-enabled-ar-collaboration-killer-app.
Iizuka et al. "Globally and Locally Consistent Image Completion", Jul. 2017. http://iizuka.cs.tsukuba.ac.jp/projects/completion/data/completion_sig2017.pdf.
Liu et al. "Image Inpainting for Irregular Holes Using Partial Convolutions", Dec. 2018.
Wang et al. "VCNet: A Robust Approach to Blind Image Inpainting", Mar. 2020.
Mildenhall et al. "NeRF: Representing Scenes as Neural Radiance Fields for View Synthesis", Aug. 2020.

* cited by examiner

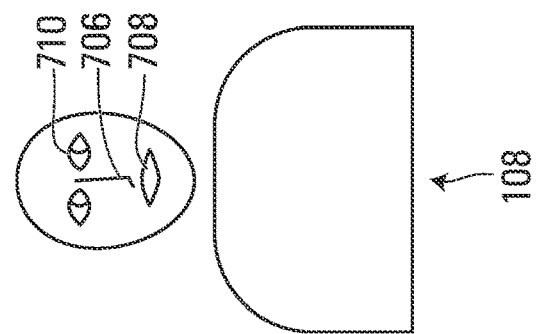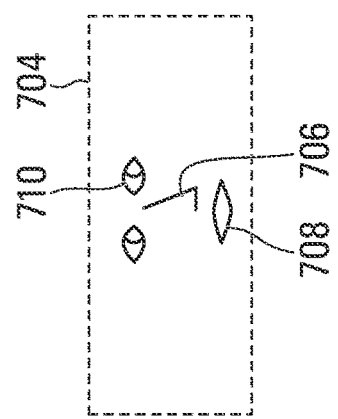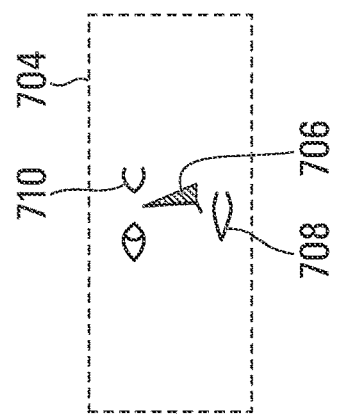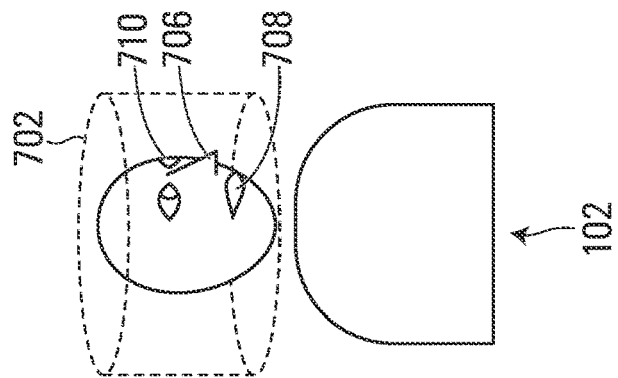

METHOD, SYSTEM, AND MEDIUM FOR 3D OR 2.5D ELECTRONIC COMMUNICATION

CROSS-REFERENCE TO RELATED APPLICATION

The present application claims priority to U.S. provisional patent application No. 63/120,061 filed on Dec. 1, 2020, and entitled "Method, System, and Medium for Three-dimensional Electronic Communication", the entirety of which is hereby incorporated by reference.

TECHNICAL FIELD

The present disclosure is directed at methods, systems, and techniques for 3D or 2.5D electronic communication.

BACKGROUND

Electronic communication between individuals is becoming increasing popular and, in certain circumstances such as during health pandemics, necessary. While two-dimensional communication (e.g., videoconferencing) is commonplace, it fails to replicate the immersion and ease of in-person communication. Electronic communication that communicates depth (e.g., 2.5D or 3D communication) can, in certain circumstances, represent an improvement in this regard over two-dimensional electronic communication.

SUMMARY

According to a first aspect, there is provided a method comprising: obtaining two-dimensional image data generated by a camera that has imaged at least part of a three-dimensional head comprising a face of a conference participant; and reconstructing a photo-realistic 2.5-dimensional or three-dimensional representation of the at least part of the head from the two-dimensional image data, wherein the representation of the at least part of the head comprises a reconstruction of an area missing from the two-dimensional image data.

The representation may be three-dimensional; alternatively, the representation may be 2.5-dimensional.

The two-dimensional image data may comprise part of 2.5-dimensional image data that is obtained.

Reconstructing the representation may comprise applying a first artificial neural network to reconstruct a volume of the at least part of the head using volumetric regression.

Reconstructing the representation may comprise applying the first artificial neural network to reconstruct a texture of the at least part of the head.

Reconstructing the representation may comprise applying a second artificial neural network to reconstruct a texture of the at least part of the head.

The texture may comprise hair on the at least part of the head, and the hair may comprise part of the area missing from the two-dimensional image data.

The second artificial neural network may comprise a second convolutional neural network.

The area missing from the two-dimensional image data and that is reconstructed may comprise an eye area of the conference participant.

The first artificial neural network may be used to reconstruct the eye area.

A third artificial neural network may be used to reconstruct the eye area.

The area missing from the two-dimensional image data and that is reconstructed may comprise an eye area of the conference participant, a third artificial neural network may be used to reconstruct the eye area, and the third artificial neural network may output two-dimensional image data with the eye area reconstructed to the first and second artificial neural networks.

The third artificial neural network may comprise a third convolutional neural network.

The first artificial neural network may comprise a first convolutional neural network.

The reconstructing may comprise performing a three-dimensional convolution, and performing the three-dimensional convolution may comprise: generating multiple two-dimensional channels of data based on the two-dimensional image data; and applying the first artificial neural network to process the multiple two-dimensional channels to reconstruct the at least part of the head.

The method may further comprise generating multiple two-dimensional channels of data based on the two-dimensional image data, and the first artificial neural network may process the multiple two-dimensional channels to reconstruct the at least part of the head.

Generating the two-dimensional channels may comprise replicating the two-dimensional image data such that each of the channels is identical to each other; and the two-dimensional channels may be used as input to the first artificial neural network.

The two-dimensional channels may be obtained from parallel branches within the first artificial neural network; and reconstructing the representation may comprise merging the two-dimensional channels.

The obtaining and the reconstructing may be performed by a server, and the camera may be networked to the server using a wide area network.

The obtaining and the reconstructing may be performed at a first computer, and the camera may comprise part of or be locally networked to the first computer.

The obtaining and the reconstructing may be performed at a second computer, and the method may further comprise displaying the representation of the at least part of the head using a three-dimensional capable display device that comprises part of or is locally networked to the second computer.

The reconstructing may be performed at a rate corresponding to the representation being updated at least 15 frames per second.

The reconstructing may be performed such that a latency between the obtaining of the two-dimensional data and the representation is under 500 ms.

Reconstructing the representation may comprise: projecting the two-dimensional image data from a world space into an object space; and in the object space, replacing at least part of the area missing from the two-dimensional image data with a corresponding area using a three-dimensional reference model of the conference participant.

The method may further comprise generating metadata describing a position and rotation of the representation within a three-dimensional virtual environment.

According to another aspect, there is provided a non-transitory computer readable medium having stored thereon computer program code that is executable by a processor and that, when executed by the processor, causes the processor to perform any of the foregoing methods or suitable combinations thereof.

According to another aspect, there is provided a system comprising: a network interface; a processor communicatively coupled to the network interface; and a non-transitory computer readable medium communicatively coupled to the processor and having stored thereon computer program code that is executable by the processor and that, when executed by the processor, causes the processor to perform any of the foregoing methods or suitable combinations thereof.

The system may further comprise a camera communicatively coupled to the processor, the camera for capturing an image of the conference participant.

The system may further comprise a display device, which may be a three-dimensional display device, communicatively coupled to the processor.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIGS. 7A-7D represent a texture reconstruction being performed on a conference participant using the system of FIGS. 1 to 3 according to another example embodiment.

DETAILED DESCRIPTION

Figure 1:
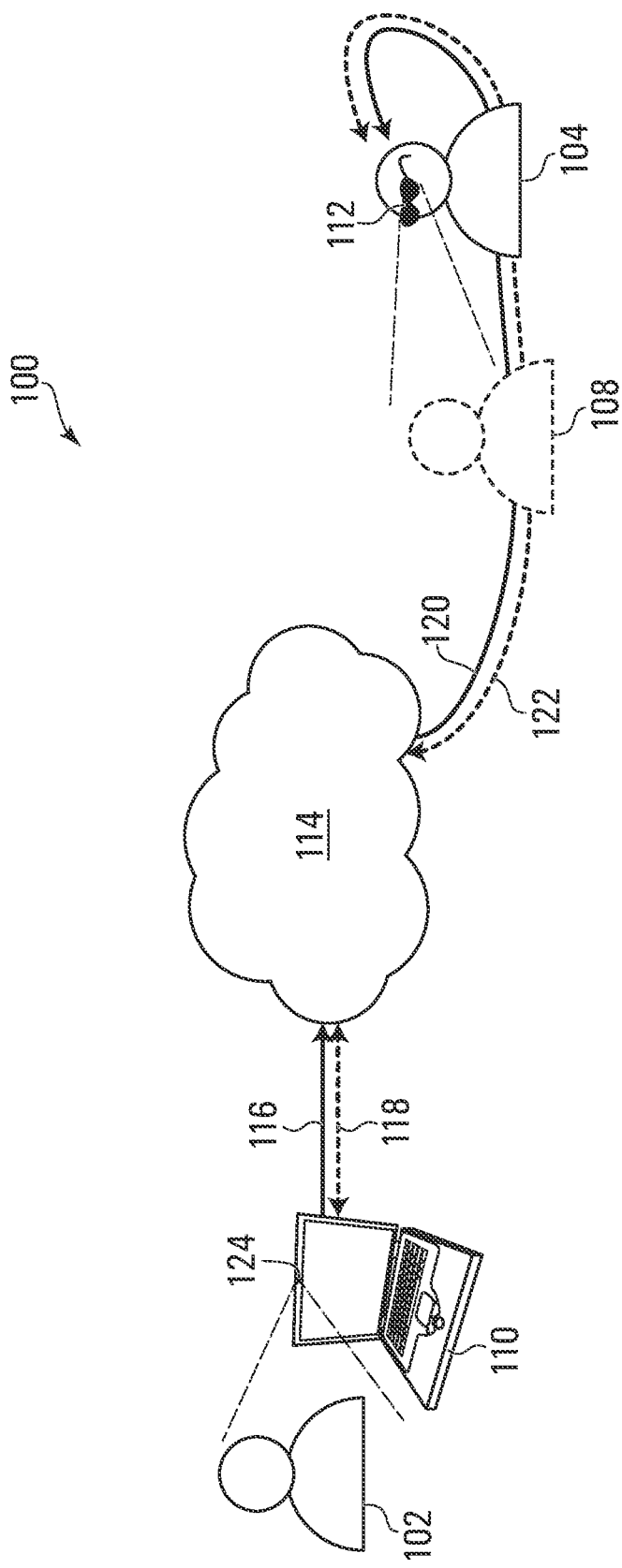
FIGS. 1 and 2 depict a system for three-dimensional electronic communication in which two parties are communicating with each other, according to an example embodiment.

Two-dimensional ("2D") communication, such as conventional videoconferencing, involves capturing a 2D video stream using a camera of a first conference participant, transmitting that data to a second conference participant, and then displaying that video stream on a display of the second conference participant. While an improvement over a phone conversation, 2D videoconferencing nonetheless falls well short of replicating the immersion and non-verbal communication possible during an in-person conversation. One way in which to improve upon 2D communication in this regard is to adopt communication that expresses depth: this may be 2.5-dimensional ("2.5D") or three-dimensional ("3D") communication.

An example of conventional 3D communication is using 3D computer models in the form of animated avatars to represent conference participants. While suitable for certain applications, using animated 3D avatars for communication sidesteps the problem of attempting to replicate realistic, in-person communication by emphasizing the computer animated nature of the avatars as a feature. Accordingly, the various problems associated with realistic 3D electronic communication, such as how to replicate at least part of a conference participant (e.g., at least that participant's face, and in certain circumstances at least that participant's head and upper body) in 3D in real-time from non-3D data, are not addressed in avatar-based systems.

In contrast, in at least some of the embodiments described herein, 3D communication is performed by regenerating photo-realistic representations of conference participants. 2D or 2.5D image data resulting from a camera having imaged at least part of a 3D face of a conference participant is obtained. In at least some embodiments, more than the face may be imaged; for example, in addition to the face, part or all of the head and/or body (e.g., neck and upper torso) may also be imaged. One or more artificial neural networks, such as convolutional neural networks (each a "CNN"), are applied to process that image data and to output data enabling reconstruction of a photo-realistic, 2.5-dimensional or three-dimensional representation of at least the conference participant's face and, depending on the input data, in some embodiments also more of the participant's body more generally (e.g., the head, neck, and upper torso). The data output by the one or more neural networks is output at a rate permitting real-time reconstruction of the face. In various example embodiments, as described further below, the one or more neural networks may be used to perform eye area deocclusion, texture reconstruction, and reconstruction of portions of a conference participant's head not depicted in the 2D or 2.5D image data that the one or more neural networks process.

As used herein, the following terms have the following meanings:

2D Data: Data depicting a 2D image, such as a bitmap, JPEG, or PNG image. 2D data includes data depicting still images, and data comprising part of a video stream depicting multiple 2D images. 2D data may include raster and vector images.

2.5D Data: 2D data that includes a depth map. For example, while 2D data may comprise RGB channels, analogous 2.5D data would comprise RGBD channels.

3D capable display device: A display device that can display a 3D object to a conference participant. Examples of 3D capable display devices comprise headsets; 3D televisions and monitors; holographic projectors; and a rendering or projection of 3D data on a classical 2D display.

3D Data: Data representing a 3D model. Examples of 3D data include voxels, depth map data, point-cloud data, and mesh data. 3D data includes data depicting a still 3D model, and a stream of data depicting a 3D model in motion. 3D data may be acquired, for example, using specialized 3D scanning hardware. Examples of suitable scanning hardware comprise "The Relightables" volumetric capture system by Google™ AI or the capture system used by Facebook™ Reality Labs. "Full-featured" 3D data of a body part herein refers to 3D data covering depicting the entirety of that body part, without gaps in the data. For example, full-featured 3D data of a person's head represents a 3D model of the head showing hair on the top of the head plus a 360 degree view around the front, sides, and back of the head.

Artificial neural network: Also referred to simply as a "neural network" herein, a type of data processing system that relies on machine learning to become suitably configured to perform a particular task. Neural networks are capable of performing massively parametric nonlinear extrapolation. Examples of neural networks that may be used in at least some of the embodiments herein are CNNs and multilayer perceptron ("MLP") neural networks.

Convolutional neural network, or CNN: A type of artificial neural network configured particularly for image processing.

Depth map: a representation of 3D data as a projection in a suitable coordinate space (e.g., Cartesian, cylindrical, or spherical) in which the 3D surface is encoded as the distances of points from a surface of the projection to a reference plane (e.g., a cylinder for a cylindrical projection, a sphere for a spherical projection, or an orthographic or perspective projection to a flat plane for Cartesian space).

Face landmarks: a vector of numbers representing one or more facial features, such as corners of eyes, the mouth, the nose, and analogous features.

Headset: Wearable glasses permitting display of 3D objects to a wearer. Example headsets comprise virtual reality ("VR"), augmented reality ("AR"), and mixed reality ("MR") headsets.

Object space: A coordinate space anchored to an object. In the object space, regardless of the motion of that object, a certain landmark on that object maintains the same coordinates. For example, if the object is a head of a person and the object space is anchored to that person's nose, then regardless of how that persons turns their head, the nose has the same object space coordinates.

Peer-to-peer ("P2P") communication: Communication between two endpoints in which data is not routed through a central server, but directly between the two endpoints.

Photo-realistic image: An image (whether 2D or 3D, and whether standalone or as part of a video) generated by data resulting from light captured on a sensor and displayed as a matrix of intensities of light and optionally color on particular locations in a raster, and images analogous thereto and/or resulting from a transformation thereof. In contrast to an avatar-based representation of a face in which only certain face landmarks are selected and mapped to an animated avatar, photo-realistic 3D video in at least some embodiments is generated not by using face landmarks as in an avatar-based approach, but from a transformation of 2D or 2.5D input video. For example, a 3D reconstruction of a head may be generated by transforming all 2D video of the head captured by a camera using an artificial neural network, as opposed to simply selecting certain facial landmarks on the head and mapping those facial landmarks to an avatar to morph the avatar.

Real-time video processing: Processing of an input video stream such that the output video stream resulting from the processing is provided at almost the same time as the input (e.g., a latency of no more than 500 ms) and at a suitable frame rate (e.g., at least 15 fps) as the input video stream.

RGB channels: The three different channels respectively used to represent a 2D image as a superposition of red, green, and blue matrices in which every entry in the matrix represents a pixel value in red, green, and blue.

RGBD channels: The four different channels respectively used to represent a 2.5D or 3D image in which RGB channels are combined with a depth channel that represents depth. Depth may be represented as z-axis position when Cartesian coordinates are used. Alternatively, depth may be represented in any suitable alternative coordinate space, such as cylindrical or spherical coordinates, in which case the values for the RGB channels are correspondingly mapped to that coordinate space.

RGB voxels: A voxel that has red, green, and blue channels, thereby permitting the voxel to represent depth and texture.

Voxels: The 3D analogue to pixels. Voxels are used to represent 3D data in a raster format.

World space: A coordinate space that is fixed regardless of the motion of particular objects within it. For example, a world space may be shared by several call participants, and motion of various objects in the world space means the world space coordinates of those objects change.

Referring now to FIG. 1, there is depicted a system 100 for 3D electronic communication, according to an example embodiment. In at least some of the example embodiments described below, the type of 3D electronic communication is holographic communication, as is possible using certain types of headsets (e.g., the Microsoft™ HoloLens™) In at least some other example embodiments, the type of 3D electronic communication may comprise, for example, displaying a 3D representation of one of the conference participants on to the 2D screen of another of the conference participants.

The system 100 of FIG. 1 is being used by a first conference participant 102 and a second conference participant 104. In FIG. 1, a first video acquisition device 110, such as a personal computer, comprising a camera 124 captures a 2D video stream of the first participant 102. The first video acquisition device 110 is networked to cloud infrastructure 114, comprising one or more servers. The cloud infrastructure 114 receives the 2D video stream from the first video acquisition device 110 and applies an artificial neural network to process it such that the artificial neural network outputs data enabling reconstruction of a photo-realistic, 2.5-dimensional or three-dimensional representation of the first participant's 102 face. In particular, the artificial neural network reconstructs in 3D portions of the first participant's 102 face not depicted in the 2D image data captured by the camera 124 on the first video acquisition device 110. For example, the artificial neural network in at least some example embodiments outputs data enabling reconstruction of a 360 degree view of the first participant's 102 head, even if the camera 124 only captures a front elevation view of the first participant's 102 face. In addition to the face, in at least some example embodiments the system 100 may also image other parts of the first participant's 102 head (e.g., the sides, back, and/or top of the head), and other parts of the first participant's 102 body (e.g., the neck and shoulders).

The output of the artificial neural network is sent to a first display device 112; in FIG. 1, the first display device 112 is a headset worn by the second participant 104. The first display device 112 receives the data output by the artificial neural network from the cloud infrastructure 114 and projects a holographic projection 108 of the first participant 102 for viewing by the second participant 104.

Communication between the first video acquisition device 110 and the cloud infrastructure 114 is performed via a first video data stream 116 and a first management data stream 118, while communication between the cloud infrastructure 114 and the first display device 112 is analogously performed via a second data stream 120 and a second management data stream 122. The contents of the various data streams 116, 118, 120, 122 are described further below.

Each of the first video acquisition device 110, first display device 112, and one or more servers comprising the cloud infrastructure 114, comprises at least one processor communicatively coupled to a computer memory that has stored on it computer program code executable by that at least one processor such that, when that at least one processor executes that computer program code, the system 100 collectively performs the functionality described herein. This implementation includes, for example, execution by a neural or artificial intelligence accelerator. More particularly, the system 100 collectively implements the actions and subsystems described below.

The first video acquisition device 110 comprises an input processing subsystem, which itself comprises a data access subsystem, a preprocessing subsystem, and a stream sender subsystem. The data access subsystem reads the 2D video stream from the camera 124 and relays the 2D video stream to the preprocessing subsystem. The preprocessing subsystem re-scales, synchronizes, and de-noises the 2D video stream. The stream sender subsystem forms the first video data stream 116 and sends the first video data stream 116 to the cloud infrastructure 114. The first video data stream 116 comprises the following channels:

- an audio channel, comprising sound data obtained using the first computer's 110 microphone;
- a video channel, comprising the 2D video stream; and
- a metadata channel, comprising additional data related to the electronic communication such as head position and head rotation data, and gaze direction and eye blink data that the cloud infrastructure 114 uses for, among other things, gaze reconstruction of the first participant 102.

In at least some other embodiments in which the first video acquisition device 110 also captures depth data (e.g., using a depth sensor or stereo camera), the first video data stream 116 may also comprise a depth data channel for transmitting that depth data. More generally herein, 2D video data may be replaced with 2.5D video data unless otherwise indicated to create additional embodiments.

While the first video data stream 116 comprises substantive content used to create the holographic projection 108, the first management data stream 118 is used for call management communications. For example, data comprising part of the first management data stream 118 is used to negotiate, initiate, and end the communication, and for setup and synchronization purposes.

The cloud infrastructure 114 performs various actions on the first and second data streams 116, 118. More particularly, the cloud infrastructure 116 receives the first and second data streams 116, 118; performs call management, including authentication and configuration of the call; performs 2D-to-3D (or 2.5D-to-3D, as referenced above) reconstruction of the first participant 102; performs texture reconstruction; performs eye area deocclusion; performs 3D processing of meshes and voxels; and outputs the data suitable for 3D reconstruction of the first participant 102 ("3D data") to the first display device 112. The cloud infrastructure 116 performs these actions with various subsystems, as described below and as depicted in FIGS. 6A and 6B.

Figure 6A:
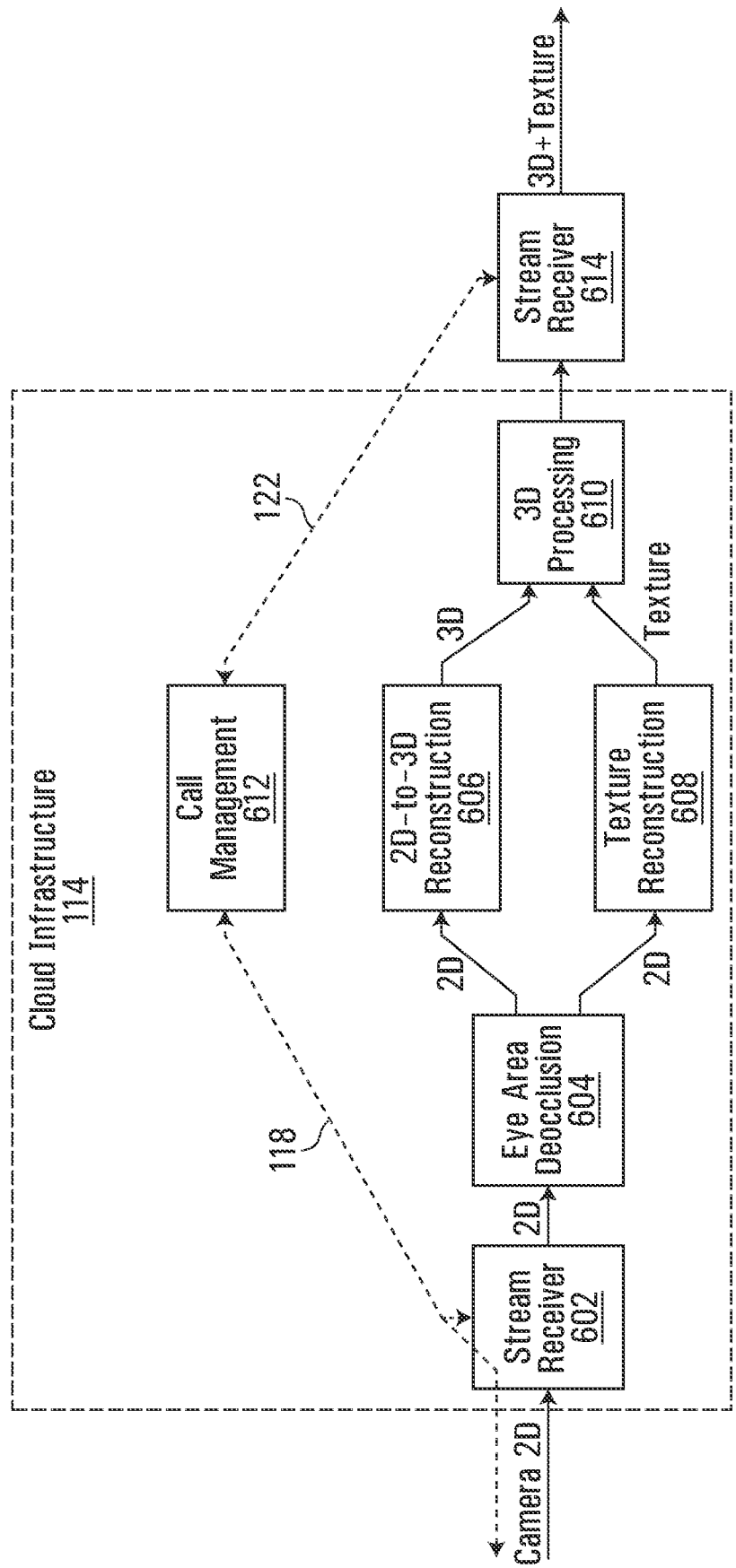
FIGS. 6A and 6B each depicts a block diagram of cloud infrastructure comprising part of the system of FIGS. 1 to 3, communicative with a stream receiver subsystem on a display device, according to additional example embodiments.

More particularly, in FIG. 6A, a stream receiver subsystem 602 receives the 2D video data from the first video data stream 116 and outputs that 2D video data to an eye area deocclusion subsystem 604. The eye area deocclusion subsystem 604 sends 2D video data in parallel to a 2D-to-3D reconstruction subsystem 606 and to a texture reconstruction subsystem 608. The 2D-to-3D reconstruction subsystem 606 outputs 3D data, and the texture reconstruction subsystem 608 outputs texture data in 2D, and both the texture data and 3D data are sent to a 3D processing subsystem 610. The 3D processing subsystem 610 sends 3D and texture data, together with related data as discussed below, to a stream receiver subsystem 614 on the first display device 112. The cloud infrastructure 114 also comprises a call management subsystem 612 that transmits and receives the first management data stream 118 and the second management data stream 122 respectively between the stream receiver subsystem 602 of the cloud infrastructure 114 and the stream receiver subsystem 614 of the first display device 112. Each of the eye area deocclusion subsystem 604, 2D-to-3D reconstruction subsystem 606, and texture reconstruction subsystem 608 is implemented using its own artificial neural network in FIG. 6A.

Figure 6B:
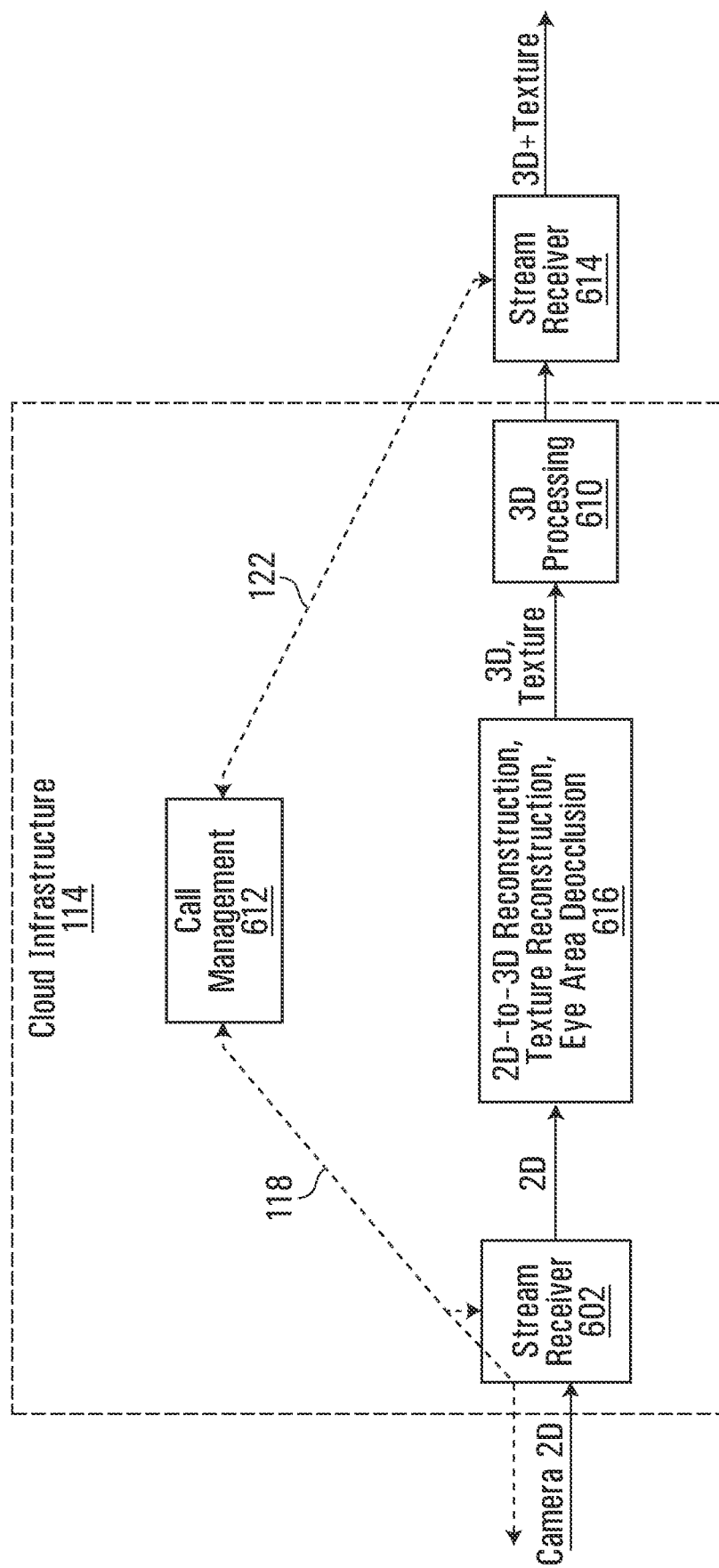

In another embodiment of the cloud infrastructure 114 as shown in FIG. 6B, the stream receiver subsystem 602 receives the 2D video data from the first video data stream and outputs that 2D video data to an integrated subsystem 616 that performs the functionality of the 2D-to-3D reconstruction subsystem 606, texture reconstruction subsystem 608, and eye area deocclusion subsystem 604 as described above. In contrast to the embodiment of FIG. 6A, this integrated subsystem may be implemented using a single artificial neural network. The integrated subsystem 616 outputs textured, 3D data to the 3D processing subsystem 610, which sends that data to the stream receiver subsystem 614 on the first display device 112 as in FIG. 6A. Also as in FIG. 6A, the call management subsystem 612 of the cloud infrastructure 114 handles call management by communicating the management data streams 118, 122 with the stream receiver subsystems 602, 614.

The functionality of the various subsystems 602, 604, 606, 608, 610, 612, 616 is discussed further below.

The call management subsystem 612 is responsible for initiating the call between the participants 102, 104. In contrast with 2D video conferencing, the call management subsystem 612 manages the position of the first conference participant 102 in a 3D virtual embodiment 318 (shown in FIG. 3) into which the first display device 112 projects the holographic projection 108.

The stream receiver subsystem 602 is responsible for receiving the data streams 116, 118 from the first video acquisition device 110.

The 2D-to-3D reconstruction subsystem 606 may comprise a CNN that is trained to output data permitting reconstruction of a 3D representation of the first participant 102 from the 2D or 2.5D video stream using volumetric regression. More particularly, the CNN is trained to reconstruct the 3D data that is missing from the 2D or 2.5D input. In at least some example embodiments, the CNN is based on that described in Aaron S. Jackson, Adrian Bulat, Vasileios Argyriou, and Georgios Tzimiropoulos, "Large Pose 3D Face Reconstruction from a Single Image via Direct Volumetric CNN Regression", arXiv:1703.07834v2 [cs.CV], 8 Sep. 2017 ("Jackson"), the entirety of which is hereby incorporated by reference. The CNN performs a direction-aligned transformation of the 2D raster of pixels received from the first video acquisition device 110 into a 3D space (e.g., a raster of voxels or depth map).

In at least some example embodiments, the CNN of Jackson may be modified to perform 3D convolutions. For a 3D convolution, multiple 2D input channels of data are merged into a single 3D object, and a convolution is performed on that object. For example, three 256×256 RGB channels can be merged into a single RRGGBB 256×256×6 object. The 2D video stream data (e.g., the RGB channels) may be converted into the 3D data stream, and that 3D data stream may be input to the CNN. The CNN then performs 3D convolutions on that 3D data (e.g., 3×3×3 convolutions). In at least some other example embodiments, multiple layers of 2D feature maps may be obtained from parallel 2D convolution branches within the CNN (e.g., seven 64-channel 58×58 branches). These branches are merged into single 3D layer (e.g., a single 64-channel 58×58×7 layer) that can be further processed with 3D convolutions (e.g., 3×3×3 convolutions). Applying 3D convolutions in this manner enables better reconstruction of the 3D representation of the first participant's 102 face on the output from CNN.

Additionally, in at least some example embodiments the CNN used may be based on an Alexnet CNN, plain RES-net CNN, or U-net CNN, as respectively described in Alex Krizhevsky, Ilya Sutskever, and Geoffrey E. Hinton, "ImageNet Classification with Deep Convolutional Neural Networks", NIPS '12: Proceedings of the 25$^{th}$ International Conference on Neural Information Processing Systems—Volume 1, December 2012, pp. 1097-1105; Kaiming He, Xiangyu Zhang, Shaoqing Ren, and Jian Sun, "Deep Residual Learning for Image Recognition", arXiv: 1512.03385v1 [cs.CV], 10 Dec. 2015; and Olaf Ronneberger, Philipp Fischer, and Thomas Brox, "U-Net: Convolutional Networks for Biomedical Image Segmentation", arXiv:1505.04597v1 [cs.CV], 18 May 2015, the entireties of all of which are hereby incorporated by reference. These CNNs are simpler than that described in Jackson, permitting faster inference rates while preserving quality of transformation in certain embodiments.

In at least some other example embodiments, the CNN is based on Phillip Isola, Jun-Yan Zhu, Tinghui Zhou, and Alexei A. Efros, "Image-to-Image Translation with Conditional Adversarial Networks", arXiv:1611.07004v3 [cs.CV], 26 Nov. 2018 ("Isola"), the entirety of which is hereby incorporated by reference. In these example embodiments, the CNN of Isola is modified by adding a depth map channel to the RGB channels of the 2D video stream that are input to the CNN. The depth channel is aligned with the RGB channels; in other words, each of the red, green, blue, and depth channels are of the same field of view. The RGB data is transformed into a 3D texture space, such as cylindrical coordinates, spherical coordinates, and/or Cartesian coordinates, in which depth is represented for the entire portion (e.g., head, or the head and a top portion of the torso) of the first participant 102 being imaged. Different coordinate spaces may be used for various portions of the body; for example, spherical coordinates may be used for a participant's head outside of the face, cylindrical coordinates may be used for a person's upper torso, and Cartesian coordinates may be used for the front of the person's face. While the CNN of Isola is a generative adversarial network ("GAN"), in these example embodiments it is performing a supervised-mode task, and accordingly can be simplified to a simpler type of supervised network, including by scaling down its architecture to Alexnet or plain RES-net. In at least some example embodiments, GAN-mode operation may be mixed with supervised-mode operation in a single network by weighting GAN-mode and supervised-mode contributions (e.g., when the discriminator-contribution is weighted at zero, the entire CNN behaves as a supervised-mode network).

In at least some example embodiments, the texture reconstruction subsystem 608 reconstructs color information for portions of the holographic projection 108 that are not depicted in the 2D data in the first video data stream 116. The artificial neural network used for texture reconstruction may be based on the CNN described in Isola. The CNN receives as input the 2D image data from the camera 124 and outputs data representing 2D color texture for the coloring of the 3D volume output by the 2D-to-3D reconstruction subsystem 606. The output of texture reconstruction subsystem 608 is given in suitable coordinates, such as cylindrical, spherical, or another suitable 3D texture space to permit the first display device 112 to generate the holographic projection 108. As described above, while in FIG. 6A the texture reconstruction subsystem 608 and 2D-to-3D reconstruction subsystem 606 are separate artificial neural networks, in FIG. 6B the CNN described in Isola is used for 3D reconstruction, the same CNN can be used to concurrently perform texture reconstruction resulting in the integrated subsystem 616.

In at least some different example embodiments, the CNN of Jackson may be analogously used to concurrently perform 3D reconstruction and texture reconstruction. For example, the CNN of Jackson may be trained to output data in the form of voxels that not only represent whether a voxel is part of the 3D reconstructed face or not, but also RGB values for that voxel to represent that voxel's color. In at least some embodiments, all reconstructed voxels (e.g., voxels representing head and torso) comprise RGB values; in at least some other example embodiments, only a portion of the reconstructed voxels (e.g., voxels for the surface of the holographic projection's 108 head) also comprise the color information.

In at least some other embodiments, different types of artificial neural networks may be used for 3D reconstruction and texture reconstruction. For example, the CNN of Isola may be used for 3D reconstruction (as a depth map reconstruction), and the CNN of Jackson may be used for texture reconstruction (as an RGB voxels reconstruction).

In at least some example embodiments, the camera 124 may comprise a depth sensor that generates 2.5D images of the first participant 102 in RGBD format. This depth data allows a cylindrical projection, or hybrid flat and cylindrical projection, of the image represented by the 2D RGB channels into the object space, which allows for better 3D reconstruction of parts of the face not depicted in the 2D image.

More particularly, transforming the face of the first participant 102 into the object space helps ensure a fixed and centered frontal view of all input images in the training data set for the artificial neural network, allowing for smaller and faster artificial neural networks than when training is performed using uncentered images from the world space. For example, in at least some example embodiments the fixed and centered frontal view in the object space permits volumetric reconstruction without using an artificial neural network by direct filling of areas missing in the 2D image captured by the camera 124 with corresponding areas from complete 3D reference models of the first participant 102 obtained in advance. For example, missing volumes in a 2D image of the first participant's 102 face may be filled using samples taken from corresponding areas of complete 3D reference models. This is feasible because the 3D contours of a person's head does not change significantly during a call; rather, facial expressions and changes in lighting during the call can result in significant changes of texture.

FIGS. 7A-7D depict a combined 2D-to-3D and texture reconstruction, in which the reconstruction comprises a transformation to the object space, being performed on the first participant's 102 face using the integrated subsystem 616, according to an example embodiment. FIG. 7A depicts the first participant 102 as seen by the camera 124 in the world space prior to any reconstruction. The first participant's 102 head is rotated such that only the right side of the first participant's 102 nose 706, mouth 708, and left eye 710 are visible to the camera 124. Without 3D and texture reconstruction, the second participant 104 would accordingly not see the left side of the first participant's 102 nose 706, mouth 708, or left eye 710 in their holographic projection 108 (i.e., were the second participant 104 to move their head to attempt to look at the left side of the nose 706, mouth 708, or left eye 710 without reconstruction there would be nothing there).

The preprocessing subsystem on the first video acquisition device 110 obtains the 2D (or 2.5D) image and cylindrically projects it on to a virtual cylinder 702 surrounding the first participant's 102 head in the world space. The result of this projection is shown in FIG. 7B, which shows the projected face in an object space 704. As only the right side of the nose 706 was captured by the camera 124, the projection of FIG. 7B correspondingly only shows the right side of the nose 706. Similarly, as only the right sides of the left eye 710 and mouth 708 are captured by the camera 124, the left sides of the left eye 710 and mouth 708 are not visible in FIG. 7B. The areas of the face hidden from the camera 124 in FIG. 7A are present in FIG. 7B but undefined.

In at least some example embodiments, the 2D projection of FIG. 7B is then input to one or more artificial neural networks for 2D-to-3D reconstruction and texture reconstruction. In order to fill the missing areas of the projection, coordinates defining those missing areas can be fed into those one or more artificial neural networks as an additional channel alongside the RGB channels, for example, of the 2D projection. Alternatively, the RGB channels without the additional channel may be input to the artificial neural network for texture reconstruction; for example, the missing areas in the RGB channels may be colored a suitable color (e.g., black or gray) and input to the artificial neural network. For texture reconstruction, the artificial neural network may be trained to perform texture reconstruction using inpainting. The projection may be input to the integrated subsystem 616 of FIG. 6B, or copies of the projection may respectively be input to the 2D-to-3D reconstruction subsystem 606 and texture reconstruction subsystem 608 of FIG. 6A. As another example, any hidden areas of the 2D projection may have a 3D reconstruction performed with corresponding areas from a 3D reference model of the first participant 102, as discussed above; this may be done without an artificial neural network. Regardless, following reconstruction the image of FIG. 7C is obtained. In FIG. 7C, the left sides of the nose 706, mouth 708, and left eye 710 have had their volume and texture reconstructed and appear in full. Following processing by the 3D processing subsystem 610, the resulting 3D data depicts a 3D model with the reconstructed left sides of the nose 706, left eye 710, and mouth 708 visible as shown in FIG. 7D.

The eye area deocclusion subsystem 604 performs eye area deocclusion when the 2D video data captured by the camera 124 excludes the eyes of the first participant 102. For example, the first participant 102 may be wearing a headset (not shown in FIG. 1, and shown in FIGS. 2 and 3 as the second display device 214), which blocks the first participant's 102 eyes and the area of the participant's 102 face surrounding the eyes (collectively, the "eye area") from the camera 124. As described above, the eye area deocclusion subsystem 604 may comprise its own artificial neural network upstream of the 2D-to-3D reconstruction subsystem and texture reconstruction subsystem 608, or may be part of the integrated subsystem 616.

In at least some example embodiments, the data input to the eye area deocclusion subsystem 604 may further comprise metadata comprising gaze direction information, which may be obtained, for example, using a camera on a front face of a phone or on a headset and positioned to record gaze. In these example embodiments, the eye area deocclusion subsystem 604 may adjust the gaze of the eyes in the reconstructed eye area accordingly.

Regardless of the particular artificial neural network implementation, training of the 2D-to-3D reconstruction subsystem 606 uses data sets comprising good quality pairs of 2D photos of individuals and aligned 3D scans of them taken concurrently as training pairs; the artificial neural network is then trained using supervised learning. For example, the 2D photos and 3D scans are taken within a sufficiently close time together such that the individuals are in substantially identical poses in both the photos and scans (e.g., less than 100 ms apart); are not overly noisy; depict the individuals in all lighting conditions in which the first participant 102 is expected to be seen in; and depict the individuals showing all the various facial expressions that the first participant 102 is expected to depict. In at least some example embodiments, training is performed using 2D and 3D training video pairs as opposed to static image pairs. An example training data set comprising video session pairs may comprise several pairs of video sessions per individual, using a reasonable number (e.g., hundreds or thousands) of people. The different video pairs comprising the training data set represent different scenarios covering the various emotions, poses, movements, and lighting that the first participant 102 is expected to be seen in when the system 100 is in use.

Artificial neural network training is done for 2D-to-3D reconstruction or 2.5D-to-3D reconstruction, depending on what type of input data is to be used in conjunction with the artificial neural network, to permit the artificial neural network to function using 2D or 2.5D input data. For 2D-to-3D reconstruction with RGB input, the RGB channels are input to the artificial neural network for reconstruction. For 2.5D-to-3D reconstruction with RGBD input, the RGBD channels are input to the artificial neural network for reconstruction. The cloud infrastructure 114 may comprise one or more artificial neural networks trained to perform 2D-to-3D reconstruction using RGB input data, and another one or more artificial neural networks trained to perform 2.5D-to-3D reconstruction using RGBD input data. The cloud infrastructure 114 may receive the RGB input data and the RGBD input data from different computers or from the first video acquisition device 110 at different times.

In at least some example embodiments in which the system 100 comprises the eye area deocclusion subsystem 604, the data used for artificial neural network training is customized to permit the artificial neural network to perform eye area deocclusion. For example, an artificial neural network for performing eye area deocclusion can be trained using supervised learning in which an input and output training image pair respectively comprise a 2D or 2.5D image of a person with the eye area occluded (e.g., masked out with a rectangular mask) and the corresponding unoccluded 2D or 2.5D image. For the embodiment of FIG. 6A in which eye area deocclusion is performed prior to texture reconstruction and 3D reconstruction, the training image pairs may comprise 2D or 2.5D images. For the embodiment of FIG. 6B in which eye area deocclusion is performed concurrently with texture reconstruction and 3D reconstruction, the training image pairs may comprise a 2D or 2.5D image as input and a 3D reconstruction as output.

In at least some example embodiments, training the artificial neural network used to implement the texture reconstruction subsystem 608 is performed using image pairs in which the image of the pair representing input is a 2D RGB image, and the image of the pair representing output is a 2D image in an appropriate projection (e.g., cylindrical or spherical projection).

The 3D processing subsystem 610 maps the outputs of the artificial neural networks described above from voxels or a depth map representation to a representation useful for the first display device 112. Example suitable representations comprise a mesh presentation, a point-cloud representation, and a depth map representation. In the embodiment of FIG. 6A, the 3D processing subsystem 610 receives inputs separately from the 2D-to-3D reconstruction subsystem 606 and the texture reconstruction subsystem 608, and accordingly aligns those inputs with each other. For example, alignment between the 3D data output by the 2D-to-3D reconstruction subsystem 606 and the 2D data output by the texture reconstruction subsystem 608 may be aligned by ensuring proper alignment of one or more facial landmarks, such as the nose.

The output of the 3D processing subsystem 610 is sent to the first display device 112 as the second data stream 120. The second data stream 120 comprises the following channels:
- an audio channel;
- a volumetric data channel, comprising full-featured 3D data or reconstructed 2.5D data in a suitable format for the first display device 112, such as a mesh representation, point-cloud representation, or depth map representation as discussed above;
- a color texture channel, comprising texture data to be applied on to the volumetric data contained in the volumetric data channel; and
- a metadata channel, comprising information describing head position and angle of rotation, spatial position data, gaze direction, and facial landmarks of the first participant 102.

The first display device 112 receives the second data stream 120 and processes it using the stream receiver subsystem 614, a 3D and texture processing subsystem, and a display subsystem. The stream receiver subsystem 614 collects the second data and management data streams 120, 122 from the cloud infrastructure 114; the 3D and texture processing subsystem performs any final corrections or transformations of the 3D image data received from the cloud infrastructure 114 into a format suitable for display by the first display device 112; and the display subsystem loads the 3D and texture data and projects the holographic projection 108 for the second participant 104.

Using the system 100 of FIG. 1, the holographic projection 108 is in at least some example embodiments updated in real-time and photo-realistic. Real-time presentation is achieved by using efficient eye area deocclusion, 2D-to-3D reconstruction, texture reconstruction, and 3D processing, and/or integrated subsystems 604, 606, 608, 610, and 616 with low latency (e.g., a cumulative latency of no more than 500 ms), high throughput (e.g., a frame rate of at least 15 fps at a resolution of 256×256×256 or higher), and sufficiently powerful hardware (e.g., an Apple™ Neural Engine™ in the case of the first video acquisition device 110, or an array of parallelized GPUs in the case of the cloud infrastructure 114). Furthermore, efficient data formats (e.g., H.264 or VP9 for 2D data), resolutions (e.g., at least 640×480 for 2D data, and at least 256×256×256 for 3D data), and streaming methods (e.g., in accordance with the WebRTC™ project) also contribute to real-time presentation of the holographic projection 108. Photo-realism is facilitated by using a 2D or 2.5D-to-3D reconstruction method based on translating pixels to voxels or a depth map as opposed to an avatar-based approach in which facial expressions are represented as feature vectors of using selected face landmarks.

Generating a 3D reconstruction in respect of FIG. 1 generally comprises capturing a 2D or 2.5D image as a raster using the first video acquisition device 110, performing raster-to-raster corrections and transformations (e.g., transforming between the world space and object space, from 2D to 3D, from voxels to point-cloud, from a 2D image lacking texture to a 2D image comprising texture) in the first video acquisition device's 110 preprocessing subsystem, the cloud infrastructure 114, and the first display device's 112 3D and texture processing subsystem, and displaying the raster as the holographic projection 108. In contrast to an avatar-based approach in which face landmarks of a selected portion of a 2D or 2.5D image are transferred to a pre-existing avatar and used to morph the avatar, the transformation as contemplated in at least some embodiments uses all the image data in the selected portion of a 2D or 2.5D image in a transformation that reconstructs a 3D object.

Figure 2:
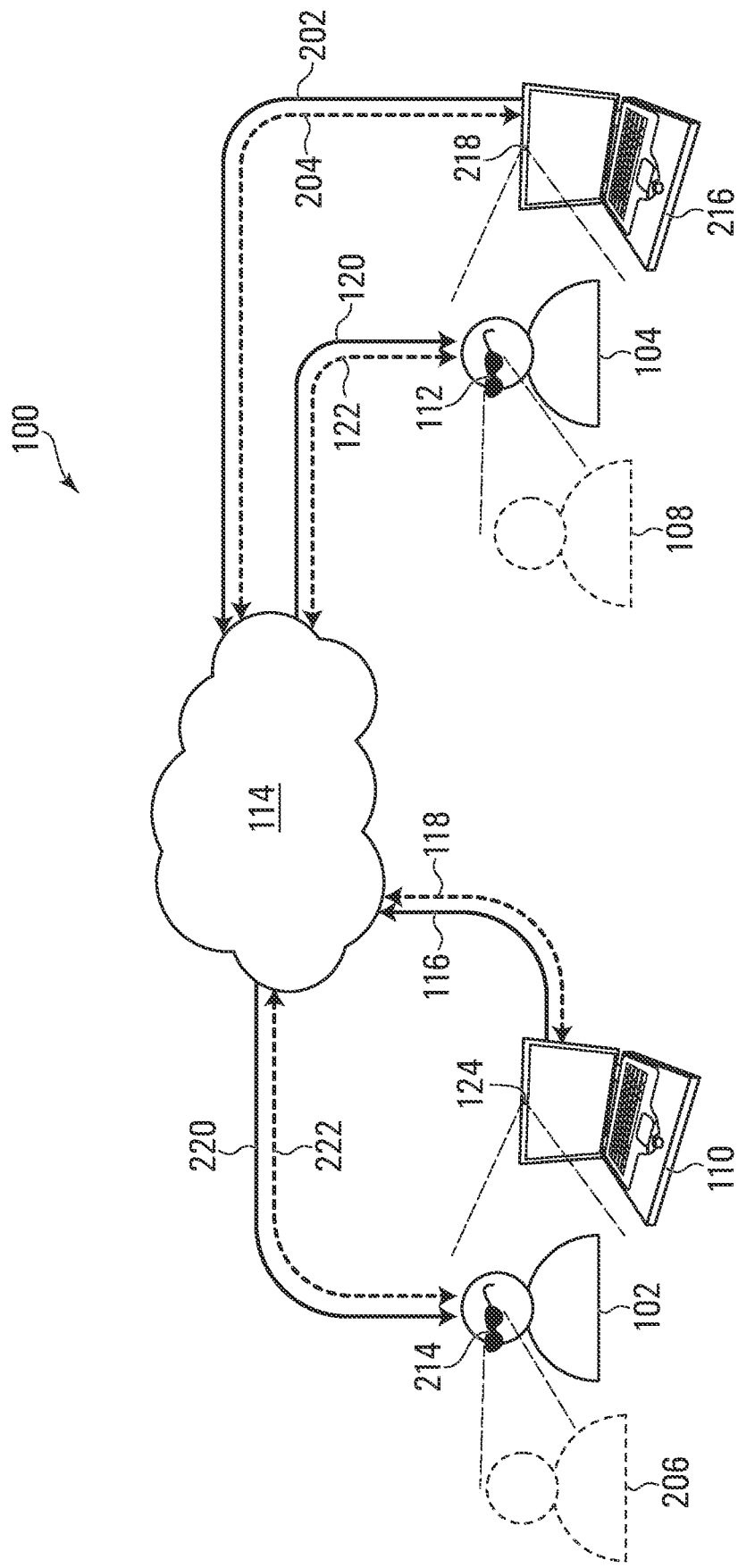

Referring now to FIG. 2, there is depicted another example embodiment of the system 100 for 3D electronic communication. While the system 100 of FIG. 1 permits one-way holographic communication from the first participant 102 to the second participant 104, the system 100 of FIG. 2 permits bi-directional holographic communication. While the system 100 of FIG. 1 implements a "one way" call from the first participant 102 to the second participant 104, the system 100 of FIG. 2 accordingly performs bi-directional electronic communication by implementing two one-way calls in parallel with each other. This is done by essentially duplicating the equipment used for the one way call of FIG. 1, thereby permitting the first participant 102 to view a holographic projection 206 of the second participant 104.

More particularly, relative to FIG. 1, the system 100 of FIG. 2 further comprises a second video acquisition device 216 comprising a second camera 218, which captures 2D images of the second participant 104. Analogous to the first video acquisition device 110, the second video acquisition device 216 also comprises a data access subsystem, a preprocessing subsystem, and a stream sender subsystem. The second video acquisition device 216 transmits to the cloud infrastructure a third video data stream 202, analogous to the first video data stream 116 sent by the first video acquisition device 110, and bi-directionally communicates with the call management subsystem 612 of the cloud infrastructure 114 using a third management data stream 204 that is analogous to the first management data stream 118 sent and received by the first video acquisition device 110.

The system 100 of FIG. 2 also comprises a second display device 214 worn by the first conference participant 102, with the second display device 214 projecting the holographic projection 206 of the second participant 104. The cloud infrastructure 114 transmits a third data stream 220, analogous to the second data stream 120, to the second display device 214. A third management data stream 222, analogous to the second management data stream 122, between the cloud infrastructure 114 and the second display device 214 is used for call management.

Figure 3:
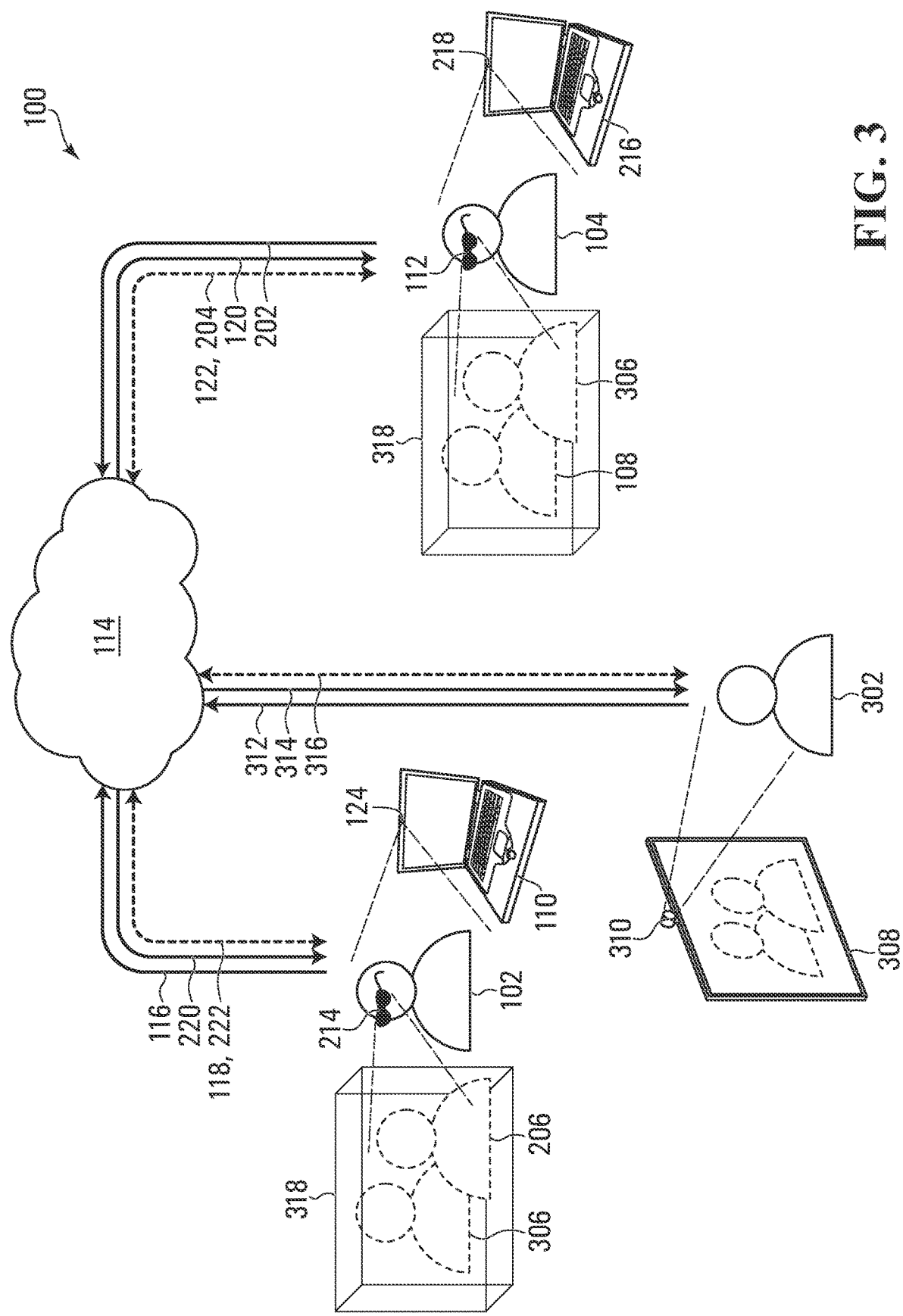
FIG. 3 depicts a system for three-dimensional electronic communication in which three parties are communicating with each other, according to another example embodiment.

FIG. 3 depicts another embodiment of the system 100 for 3D electronic communication in which a third conference participant 302 holographically conferences with the first and second participants 102, 104. Analogous to how the system 100 of FIG. 2 permits two-way communication by doubling the equipment used to implement the system 100 of FIG. 1, the system 100 of FIG. 3 permits three-way communication by tripling the equipment in the system 100 of FIG. 1. Relative to the system 100 of FIG. 2, the system 100 of FIG. 3 accordingly further comprises a third video acquisition device comprising a third camera 310 that captures a 2D video stream of the third participant 302. The third camera 310 transmits a fourth video data stream 312 to the cloud infrastructure 114 and receives a fourth management data stream 316 from the cloud infrastructure 114. The fourth video data stream 312 is analogous to the first and third video data streams 116, 202, and accordingly permits each of the first and second participants 102, 104 to view a holographic projection 306 of the third participant 302. The fifth data stream 314 is analogous to the second and third data streams 120, 220, and accordingly sends textured, 3D data to a third display device 308 in the form of a television that permits the third participant 302 to view 2.5D representations of the first and second participants 102, 104 on a screen. A fourth management data stream 316 collectively represents bi-directional data streams between each of the third video camera 310 and third display device 308 and the cloud infrastructure 114 for call management, and is analogous to the first and third management data streams 118, 222 in respect of the first participant 102 and to the second and third management data streams 122, 204 in respect of the second participant 104.

In contrast to the embodiments of FIGS. 1 and 2, in FIG. 3 each of the first and second participants 102, 104 views two of the holographic projections 108, 206, 306, while the third participant 302 views 2.5D representations based on 3D models of the first and second participants 102, 104. Consequently, the call management data also comprises spatial positioning of each of the projections 108, 206, 306 within the 3D virtual environments 318 of the first and second display devices 112, 214 and the representation of the 3D virtual environment 318 displayed on the third display device 308. The call management subsystem 612 in the cloud infrastructure 114 maintains relative 3D positioning between the holographic projections 108, 206, 306 for each of the 3D virtual environments 318 of the first and second display devices 112, 214 and the representation of the 3D virtual environment 318 displayed on the third display device 308, and transmits that positioning to each of the first through third display devices 112, 214, 308 for their use during holographic projection (for the first and second display devices 112, 214) and 2.5D representation (for the third display device 308). A conference of more than the three participants 102, 104, 304 may be organized analogously as shown in FIG. 3. More particularly, each of the fourth and subsequent participants may be treated analogously as any of the first through third participants 102, 104, 302.

Figure 4:
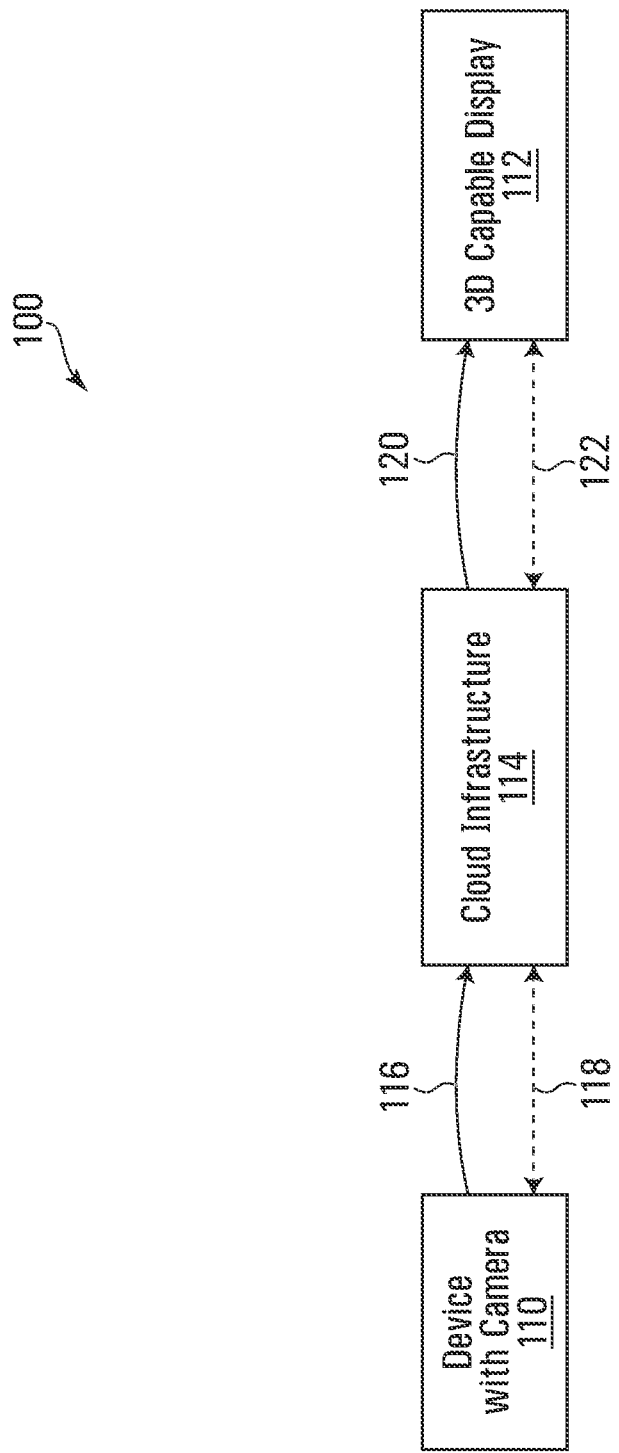
FIGS. 4 and 5 depict block diagrams of a system for three-dimensional electronic communication, according to additional example embodiments.

Referring now to FIG. 4, there is a shown a block diagram of an embodiment of the system 100 for 3D electronic communication, according to another embodiment. The system 100 of FIG. 4 comprises a device with a camera such as the first video acquisition device 110, the cloud infrastructure 114, and a 3D capable display such as the first display device 112. As discussed above, the first video data stream 116 transmits video data from the first video acquisition device 110 to the cloud infrastructure 114, the second data stream 120 transmits data from the cloud infrastructure 114 to the first display device 112, and the first and second management data streams 118, 122 bi-directionally transmit call management data between the first video acquisition device 110 and the cloud infrastructure 114, and between the cloud infrastructure 114 and the first display device 112.

The content of the data streams 116, 120 and the tasks performed by the first video acquisition device 110, cloud infrastructure 114, and first display device 112 may change, depending on the particular embodiment. For example, as described above in respect of the example embodiment of FIG. 1, the first video acquisition device 110 comprises the data access subsystem, the preprocessing subsystem, and the stream sender subsystem; the cloud infrastructure 114 comprises the call management subsystem 612, the stream receiver subsystem 602, the 2D-to-3D reconstruction subsystem 606, the texture reconstruction subsystem 608, the eye area deocclusion subsystem 604, the 3D processing subsystem 610, and the stream sender subsystem; and the first display device 112 comprises the stream receiver subsystem 614, the 3D and texture processing subsystem, and the display subsystem. Consequently, the first video data stream 116 comprises 2D (or 2.5D) data, which the cloud infrastructure 114 processes into volumetric video data with color texture that is contained in the second data stream 120.

The functionality performed by the first video acquisition device 110, the cloud infrastructure 114, and the first display device 112 may vary in different embodiments. For example, in an example embodiment in which the first display device 112 comprises sufficiently powerful hardware (e.g., any sufficiently powerful combination of a central processing unit, graphical processing unit, and neural processor) to perform 3D reconstruction itself, 2D-to-3D reconstruction may be shifted from the cloud infrastructure to the first display device 112. For example, the cloud infrastructure 114 may comprise the call management subsystem 612, the stream receiver subsystem 602, the stream sender subsystem, and a 2D processing subsystem for performing basic 2D processing of video data such as rescaling. And, in addition to comprising the stream receiver subsystem 614, 3D and texture processing subsystem, and display subsystem, the first display device 112 may further comprise the 2D-to-3D reconstruction subsystem 606, the texture reconstruction subsystem 608, and the eye area deocclusion subsystem 604 that are found in the cloud infrastructure 114 in the embodiment of FIG. 6A. In this example embodiment, the video data in the first and second data streams 116, 120 is 2D (or 2.5D) data, and is not reconstructed as 3D data until it arrives at the first display device 112.

Conversely, in at least some example embodiments, 3D processing may be performed upstream of the cloud infrastructure 114 at the first video acquisition device 110. In these example embodiments, the first video acquisition device 110 may comprise the data access subsystem, the preprocessing subsystem, and the stream sender subsystem, and may further comprise the 2D-to-3D reconstruction subsystem 606, the texture reconstruction subsystem 608, the eye area deocclusion subsystem 604, and the 3D processing subsystem 610. The cloud infrastructure 114 accordingly comprises the call management system 612, the stream receiver subsystem, and the stream sender subsystem; and the first display device 112 comprises the stream receiver subsystem 610 and the display subsystem. The 3D and texture processing subsystem may be in either the cloud infrastructure 114 or the first video acquisition device 110. As 3D reconstruction is performed at the first video acquisition device 110 in these embodiments, 3D data is transmitted using the first and second data streams 116, 120.

Figure 5:
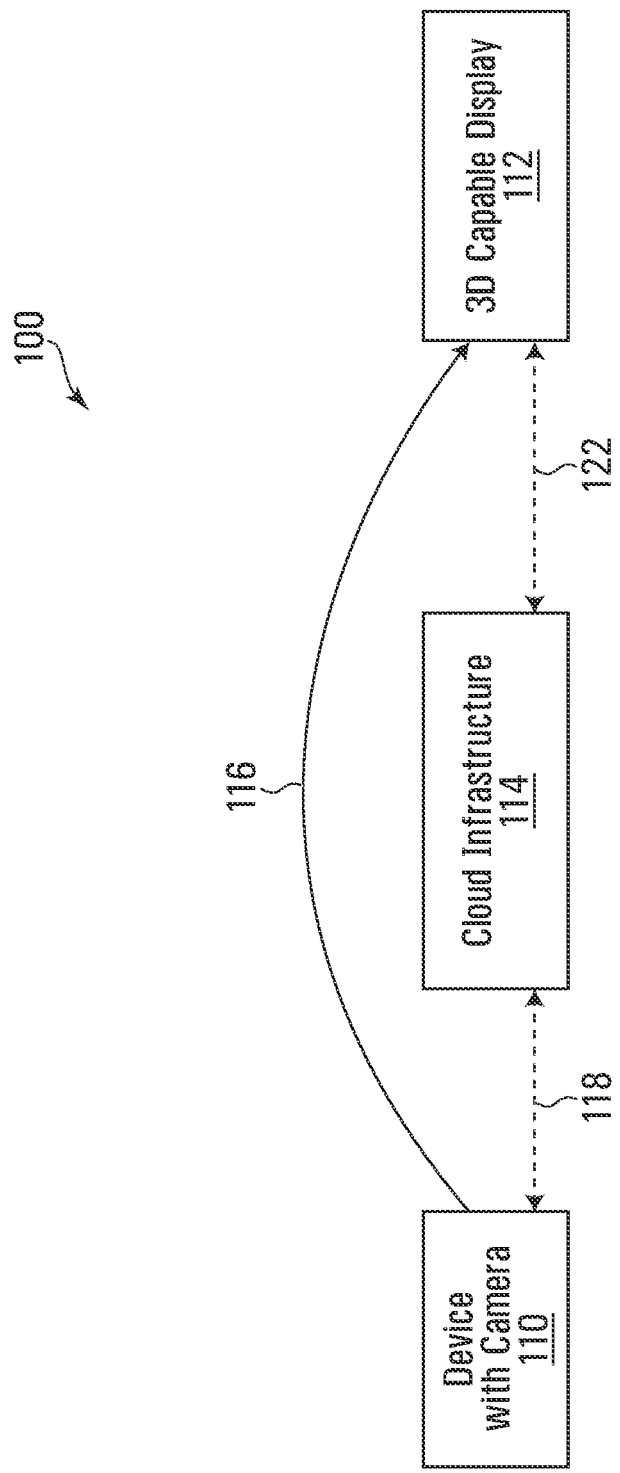

Referring now to FIG. 5, there is shown an embodiment of the system 100 in which the first video acquisition device 110 and the first display device 112 communicate on a peer-to-peer basis. In this example embodiment, the cloud infrastructure 114 comprises the call management subsystem 612, and is functionally only responsible for call management as is indicated by the first management data stream 118 being bi-directionally transmitted between the first video acquisition device 110 and the cloud infrastructure 114, and the second management data stream 122 being bi-directionally transmitted between the cloud infrastructure 114 and the first display device 112. As the cloud infrastructure 114 is only responsible for call management, functionality otherwise performed by the cloud infrastructure 114 is shifted to one or both of the first video acquisition device 110 and the first display device 112.

For example, in at least some of the peer-to-peer embodiments, the first video acquisition device 110 comprises the data access subsystem, the preprocessing subsystem, and the stream sender subsystem; and the first display device 112 comprises the stream receiver subsystem 614, the preprocessing subsystem, the 2D-to-3D reconstruction subsystem 606, the texture reconstruction subsystem 608, the eye area deocclusion subsystem 604, the 3D processing subsystem 610, and the display subsystem. Consequently, the first video data stream 116 comprises 2D (or 2.5D) data, which is reconstructed as 3D data at the first display device 112.

Conversely, in at least some other peer-to-peer embodiments, the first display device 112 comprises the stream receiver subsystem 614, the 3D and texture processing subsystem, and the display subsystem; and the first video acquisition device 110 comprises the data access subsystem, the preprocessing subsystem, 2D-to-3D reconstruction subsystem 606, texture reconstruction subsystem 608, eye area deocclusion subsystem 604, 3D processing subsystem 610, and stream sender subsystem. Consequently, the first data stream 116 comprises 3D data.

While the depicted embodiments are generally described in the context of 2D-to-3D or 2.5D-to-3D reconstruction, in at least some example embodiments the reconstruction may be a 2.5D reconstruction as opposed to a 3D reconstruction. Foe example, the 2D-to-3D reconstruction may be simplified as a 2D-to-2.5D reconstruction, and the 2.5D-to-3D reconstruction may be simplified as a 2.5D-to-2.5D reconstruction. For 2.5D reconstruction, 3D scans used as part of the training data mentioned above may be replaced with corresponding 2.5D data.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

A "computer" or "server" used in the foregoing embodiments may comprise, for example, a processing unit (such as a processor, microprocessor, or programmable logic controller, including when they form part of a central processing unit or graphical processing unit) communicatively coupled to a non-transitory computer readable medium having stored on it program code for execution by the processing unit, microcontroller (which comprises both a processing unit and a non-transitory computer readable medium), field programmable gate array (FPGA), system-on-a-chip (SoC), an application-specific integrated circuit (ASIC), or an artificial intelligence accelerator. Examples of computer readable media are non-transitory and include disc-based media such as CD-ROMs and DVDs, magnetic media such as hard drives and other forms of magnetic disk storage, semiconductor based media such as flash media, random access memory (including DRAM and SRAM), and read only memory. In at least some example embodiments, a computer may also be embedded in or otherwise comprise part of a device such as a smartphone, tablet, television set, holographic projector, headset, and other similar or analogous devices.

It is contemplated that any part of any aspect or embodiment discussed in this specification can be implemented or combined with any part of any other aspect or embodiment discussed in this specification.

In construing the claims, it is to be understood that the use of computer equipment, such as a processor, to implement the embodiments described herein is essential at least where the presence or use of that computer equipment is positively recited in the claims.

One or more example embodiments have been described by way of illustration only. This description is being presented for purposes of illustration and description, but is not intended to be exhaustive or limited to the form disclosed. It will be apparent to persons skilled in the art that a number of variations and modifications can be made without departing from the scope of the claims.

The invention claimed is:

1. A method comprising:
   (a) obtaining a video data stream comprising two-dimensional image data generated by a camera that has imaged at least part of a three-dimensional head comprising a face of a conference participant; and
   (b) reconstructing a photo-realistic 2.5-dimensional or three-dimensional representation of the at least part of the head from the two-dimensional image data, wherein the representation of the at least part of the head comprises a reconstruction of at least one area missing from the two-dimensional image data, and wherein the at least one area comprises a part of the head other than the face, wherein the video data stream further comprises metadata and depth data corresponding to the two-dimensional image data, and wherein reconstructing the representation is performed using the metadata, the depth data, and the two-dimensional image data.

2. The method of claim 1, wherein the representation is three-dimensional.

3. The method of claim 2, wherein the representation is holographic.

4. The method of claim 1, wherein the representation is 2.5-dimensional.

5. The method of claim 1, wherein the two-dimensional image data comprises part of 2.5-dimensional image data that is obtained.

6. The method of claim 1, wherein reconstructing the representation comprises applying a first artificial neural network to reconstruct a volume of the at least part of the head using volumetric regression.

7. The method of claim 6, wherein reconstructing the representation comprises applying the first artificial neural network to reconstruct a texture of the at least part of the head.

8. The method of claim 7, wherein the texture comprises hair on the at least part of the head, wherein the hair comprises part of the at least one area missing from the two-dimensional image data.

9. The method of claim 6, wherein reconstructing the representation comprises applying a second artificial neural network to reconstruct a texture of the at least part of the head.

10. The method of claim 9, wherein the second artificial neural network comprises a second convolutional neural network.

11. The method of claim 9, wherein the at least one area missing from the two-dimensional image data and that is reconstructed comprises an eye area of the conference participant, wherein a third artificial neural network is used to reconstruct the eye area, and wherein the third artificial neural network outputs two-dimensional image data with the eye area reconstructed to the first and second artificial neural networks.

12. The method of claim 6, wherein the at least one area missing from the two-dimensional image data and that is reconstructed comprises an eye area of the conference participant.

13. The method of claim 12, wherein the first artificial neural network is used to reconstruct the eye area.

14. The method of claim 12, wherein a third artificial neural network is used to reconstruct the eye area.

15. The method of claim 14, wherein the third artificial neural network comprises a third convolutional neural network.

16. The method of claim 6, wherein the first artificial neural network comprises a first convolutional neural network, wherein the reconstructing comprises performing a three-dimensional convolution, and wherein performing the three-dimensional convolution comprises:
   (a) generating multiple two-dimensional channels of data based on the two-dimensional image data; and
   (b) applying the first artificial neural network to process the multiple two-dimensional channels to reconstruct the at least part of the head.

17. The method of claim 16, wherein:
   (a) generating the two-dimensional channels comprises replicating the two-dimensional image data such that each of the channels is identical to each other; and
   (b) the two-dimensional channels are used as input to the first artificial neural network.

18. The method of claim 16, wherein:
   (a) the two-dimensional channels are obtained from parallel branches within the first artificial neural network; and
   (b) reconstructing the representation comprises merging the two-dimensional channels.

19. The method of claim 1, wherein the obtaining and the reconstructing are performed by a server, and wherein the camera is networked to the server using a wide area network.

20. The method of claim 1, wherein the obtaining and the reconstructing are performed at a first computer, and wherein the camera comprises part of or is locally networked to the first computer.

21. The method of claim 1, wherein the obtaining and the reconstructing are performed at a second computer, and further comprising displaying the representation of the at least part of the head using a three-dimensional capable display device that comprises part of or is locally networked to the second computer.

22. The method of claim 1, wherein the reconstructing is performed at a rate corresponding to the representation being updated at least 15 frames per second and such that a latency between the obtaining of the two-dimensional data and the representation is under 500 ms.

23. The method of claim 1, wherein reconstructing the representation comprises:
   (a) projecting the two-dimensional image data from a world space into an object space; and
   (b) in the object space, replacing at least part of the at least one area missing from the two-dimensional image data using a three-dimensional reference model of the conference participant.

24. The method of claim 23, wherein the representation is three-dimensional, the video data stream further comprises depth data corresponding to the two-dimensional image data, and wherein the depth data is used to project the two-dimensional image data from the world space into the object space.

25. The method of claim 1, wherein the metadata describes a position and rotation of the representation within a three-dimensional virtual environment.

26. The method of claim 1, wherein the part of the head other than the face that is reconstructed comprises a first part of the head other than the face and wherein the at least one area that is reconstructed further comprises a part of the face, wherein the image data used for the reconstructing comprises a second part of the head other than the face, and wherein the reconstruction is done in real-time.

27. At least one non-transitory computer readable medium having stored thereon computer program code that is executable by at least one processor and that, when executed by the at least one processor, causes the at least one processor to perform a method comprising:

(a) obtaining a video data stream comprising two-dimensional image data generated by a camera that has imaged at least part of a three-dimensional head comprising a face of a conference participant; and (b) reconstructing a photo-realistic 2.5-dimensional or three-dimensional representation of the at least part of the head from the two-dimensional image data, wherein the representation of the at least part of the head comprises a reconstruction of at least one area missing from the two-dimensional image data, and wherein the at least one area comprises a part of the head other than the face, wherein the video data stream further comprises metadata and depth data corresponding to the two-dimensional image data, and wherein reconstructing the representation is performed using the metadata, the depth data, and the two-dimensional image data.

28. A system comprising:
(a) at least one network interface;
(b) at least one processor communicatively coupled to the at least one network interface; and
(c) at least one non-transitory computer readable medium communicatively coupled to the at least one processor and having stored thereon computer program code that is executable by the at least one processor and that, when executed by the at least one processor, causes the at least one processor to perform a method comprising:
   (i) obtaining a video data stream comprising two-dimensional image data generated by a camera that has imaged at least part of a three-dimensional head comprising a face of a conference participant; and
   (ii) reconstructing a photo-realistic 2.5-dimensional or three-dimensional representation of the at least part of the head from the two-dimensional image data, wherein the representation of the at least part of the head comprises a reconstruction of at least one area missing from the two-dimensional image data, and wherein the at least one area comprises a part of the head other than the face wherein the video data stream further comprises metadata and depth data corresponding to the two-dimensional image data, and wherein reconstructing the representation is performed using the metadata, the depth data, and the two-dimensional image data.

29. A method comprising:
(a) obtaining a video data stream comprising two-dimensional image data generated by a camera that has imaged at least part of a three-dimensional head comprising a face of a conference participant; and
(b) reconstructing a photo-realistic 2.5-dimensional or three-dimensional representation of the at least part of the head from the two-dimensional image data, wherein the representation of the at least part of the head comprises a reconstruction of at least one area missing from the two-dimensional image data, and wherein the at least one area comprises a part of the head other than the face, wherein reconstructing the representation comprises:
   (i) projecting the two-dimensional image data from a world space into an object space; and
   (ii) in the object space, replacing at least part of the at least one area missing from the two-dimensional image data using a three-dimensional reference model of the conference participant.

30. The method of claim 29, wherein the representation is three-dimensional.

31. The method of claim 30, wherein the representation is holographic.

32. The method of claim 29, wherein the representation is 2.5-dimensional.

33. The method of claim 29, wherein the two-dimensional image data comprises part of 2.5-dimensional image data that is obtained.

34. The method of claim 29, wherein reconstructing the representation comprises applying a first artificial neural network to reconstruct a volume of the at least part of the head using volumetric regression.

35. The method of claim 34, wherein reconstructing the representation comprises applying the first artificial neural network to reconstruct a texture of the at least part of the head.

36. The method of claim 35, wherein the texture comprises hair on the at least part of the head, wherein the hair comprises part of the at least one area missing from the two-dimensional image data.

37. The method of claim 34, wherein reconstructing the representation comprises applying a second artificial neural network to reconstruct a texture of the at least part of the head.

38. The method of claim 37, wherein the second artificial neural network comprises a second convolutional neural network.

39. The method of claim 37, wherein the at least one area missing from the two-dimensional image data and that is reconstructed comprises an eye area of the conference participant, wherein a third artificial neural network is used to reconstruct the eye area, and wherein the third artificial neural network outputs two-dimensional image data with the eye area reconstructed to the first and second artificial neural networks.

40. The method of claim 34, wherein the at least one area missing from the two-dimensional image data and that is reconstructed comprises an eye area of the conference participant.

41. The method of claim 40, wherein the first artificial neural network is used to reconstruct the eye area.

42. The method of claim 40, wherein a third artificial neural network is used to reconstruct the eye area.

43. The method of claim 42, wherein the third artificial neural network comprises a third convolutional neural network.

44. The method of claim 34, wherein the first artificial neural network comprises a first convolutional neural network, wherein the reconstructing comprises performing a three-dimensional convolution, and wherein performing the three-dimensional convolution comprises:
(a) generating multiple two-dimensional channels of data based on the two-dimensional image data; and
(b) applying the first artificial neural network to process the multiple two-dimensional channels to reconstruct the at least part of the head.

45. The method of claim 44, wherein:
(a) generating the two-dimensional channels comprises replicating the two-dimensional image data such that each of the channels is identical to each other; and
(b) the two-dimensional channels are used as input to the first artificial neural network.

46. The method of claim 44, wherein:
(a) the two-dimensional channels are obtained from parallel branches within the first artificial neural network; and
(b) reconstructing the representation comprises merging the two-dimensional channels.

47. The method of claim 29, wherein the obtaining and the reconstructing are performed by a server, and wherein the camera is networked to the server using a wide area network.

48. The method of claim 29, wherein the obtaining and the reconstructing are performed at a first computer, and wherein the camera comprises part of or is locally networked to the first computer.

49. The method of claim 29, wherein the obtaining and the reconstructing are performed at a second computer, and further comprising displaying the representation of the at least part of the head using a three-dimensional capable display device that comprises part of or is locally networked to the second computer.

50. The method of claim 29, wherein the reconstructing is performed at a rate corresponding to the representation being updated at least 15 frames per second and such that a latency between the obtaining of the two-dimensional data and the representation is under 500 ms.

51. The method of claim 29, wherein metadata describes a position and rotation of the representation within a three-dimensional virtual environment.

52. The method of claim 29, wherein the representation is three-dimensional, the video data stream further comprises depth data corresponding to the two-dimensional image data, and wherein the depth data is used to project the two-dimensional image data from the world space into the object space.

53. The method of claim 29, wherein the part of the head other than the face that is reconstructed comprises a first part of the head other than the face and wherein the at least one area that is reconstructed further comprises a part of the face, wherein the image data used for the reconstructing comprises a second part of the head other than the face, and wherein the reconstruction is done in real-time.

54. At least one non-transitory computer readable medium having stored thereon computer program code that is executable by at least one processor and that, when executed by the at least one processor, causes the at least one processor to perform a method comprising:
  (a) obtaining a video data stream comprising two-dimensional image data generated by a camera that has imaged at least part of a three-dimensional head comprising a face of a conference participant; and
  (b) reconstructing a photo-realistic 2.5-dimensional or three-dimensional representation of the at least part of the head from the two-dimensional image data, wherein the representation of the at least part of the head comprises a reconstruction of at least one area missing from the two-dimensional image data, and wherein the at least one area comprises a part of the head other than the face, wherein reconstructing the representation comprises:
    (i) projecting the two-dimensional image data from a world space into an object space; and
    (ii) in the object space, replacing at least part of the at least one area missing from the two-dimensional image data using a three-dimensional reference model of the conference participant.

55. A system comprising:
  (a) at least one network interface;
  (b) at least one processor communicatively coupled to the at least one network interface; and
  (c) at least one non-transitory computer readable medium communicatively coupled to the at least one processor and having stored thereon computer program code that is executable by the at least one processor and that, when executed by the at least one processor, causes the at least one processor to perform a method comprising:
    (i) obtaining a video data stream comprising two-dimensional image data generated by a camera that has imaged at least part of a three-dimensional head comprising a face of a conference participant; and
    (ii) reconstructing a photo-realistic 2.5-dimensional or three-dimensional representation of the at least part of the head from the two-dimensional image data, wherein the representation of the at least part of the head comprises a reconstruction of at least one area missing from the two-dimensional image data, and wherein the at least one area comprises a part of the head other than the face, wherein reconstructing the representation comprises:
      (1) projecting the two-dimensional image data from a world space into an object space; and
      (2) in the object space, replacing at least part of the at least one area missing from the two-dimensional image data using a three-dimensional reference model of the conference participant.

\* \* \* \* \*